United States Patent
Lomenzo, Jr. et al.

(10) Patent No.: US 12,221,891 B1
(45) Date of Patent: Feb. 11, 2025

(54) MULTI-PIECE RING SEAL

(71) Applicant: RTX CORPORATION, Farmington, CT (US)

(72) Inventors: Richard A. Lomenzo, Jr., Enfield, CT (US); Philip Andrew Varney, Coventry, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/365,445

(22) Filed: Aug. 4, 2023

(51) Int. Cl.
*F01D 11/00* (2006.01)

(52) U.S. Cl.
CPC ........ *F01D 11/006* (2013.01); *F05D 2240/58* (2013.01)

(58) Field of Classification Search
CPC ...... F01D 11/00; F01D 11/003; F01D 11/005; F01D 11/006; F01D 25/183; F02C 7/28; F05D 2220/32; F05D 2240/55
See application file for complete search history.

(56) References Cited

U.S. PATENT DOCUMENTS

| | | | |
|---|---|---|---|
| 1,360,967 A | 11/1920 | Marshall | |
| 3,522,950 A | 8/1970 | Schneck, Jr. | |
| 4,750,746 A * | 6/1988 | Boudot | F16J 15/184 415/230 |
| 5,562,294 A * | 10/1996 | Marsi | F16J 15/164 277/358 |
| 8,939,710 B2 * | 1/2015 | Webb | F01D 11/005 415/113 |
| 2005/0242519 A1 | 11/2005 | Koleilat et al. | |
| 2013/0051993 A1 | 2/2013 | Webb | |
| 2022/0259975 A1 | 8/2022 | Heyerman | |

OTHER PUBLICATIONS

Extended European Search Report for European Application No. 24192724.3 mailed Nov. 25, 2024.

* cited by examiner

*Primary Examiner* — Loren C Edwards
(74) *Attorney, Agent, or Firm* — Carlson, Gaskey & Olds, P.C.

(57) ABSTRACT

A rotor assembly for a gas turbine engine includes a shaft co-rotatable with a rotor with an annular seal assembly that is carried within an annular channel within the shaft that provides a seal between the shaft and the bore. The annular seal assembly includes a first member that is configured to seal against a radial surface of the bore and a second member that is configured to seal against an axial surface of the annular channel.

14 Claims, 6 Drawing Sheets

MULTI-PIECE RING SEAL

BACKGROUND

A gas turbine engine typically includes a fan section, a compressor section, a combustor section and a turbine section. The compressor section includes a plurality of stages with blades progressively increasing inlet air pressure. Between some of the stages of the compressor section are seals disposed between a commonly rotating shaft and an inner bore of a compressor rotor. The seals separate stages of different pressures. Leakage past the seals can impact compressor and engine efficiencies.

Turbine engine manufacturers continue to seek further improvements to engine performance including improvements to thermal, transfer and propulsive efficiencies.

SUMMARY

A rotor assembly for a gas turbine engine according to an exemplary embodiment of this disclosure includes, among other possible things, a rotor that includes a hub that has a bore and carries one or more rotatable blades, a shaft that is rotatable about an engine axis and extends through the bore, the shaft is co-rotatable with the rotor, an annular seal assembly that is carried within an annular channel within the shaft that provides a seal between the shaft and the bore, the annular seal assembly includes a first member that is configured to seal against a radial surface of the bore and a second member that is configured to seal against an axial surface of the annular channel.

In a further embodiment of the foregoing rotor assembly, the annular channel includes at least one guide surface and the second member includes a guided surface. An interface between the guide surface and the guided surface are configured to generate the seal against the axial surface.

In a further embodiment of any of the foregoing rotor assemblies, the interface between the guide surface and the guided surface is configured to generate a biasing force against the first member in response to rotation of the shaft and rotor.

In a further embodiment of any of the foregoing rotor assemblies, the guide surface and the guided surface are both angled relative to a plane that is perpendicular to the engine axis.

In a further embodiment of any of the foregoing rotor assemblies, the annular channel includes a first guide surface and a second guide surface and the annular seal assembly includes a third member that is disposed on an axially opposite side of the first member. The second member abuts the first guide surface and the third member includes a guided surface that is configured to abut the second guide surface.

In a further embodiment of any of the foregoing rotor assemblies, each of the first member includes a first radial height and the second member includes a second radial height that is less than the first radial height.

In a further embodiment of any of the foregoing rotor assemblies, the first member includes a rectilinear shape in cross-section.

In a further embodiment of any of the foregoing rotor assemblies, the second member includes a wedge shape in cross-section.

In a further embodiment of any of the foregoing rotor assemblies, the rotor is part of a compressor section of the gas turbine engine.

In a further embodiment of any of the foregoing rotor assemblies, each of the first member and the second member includes a circumferential gap between spaced apart ends.

A gas turbine engine according to another exemplary embodiment of this disclosure includes, among other possible things, a fan that includes a plurality of fan blades that are rotatable about an axis, a compressor section, a combustor that is in fluid communication with the compressor section, a turbine section that is in fluid communication with the combustor, a rotor within at least one of the turbine section and the compressor section, the rotor includes a hub that has a bore and carries one or more rotatable blades, a shaft that rotatably extends through the bore and co-rotatable with the rotor, and an annular seal assembly that is carried within an annular channel within the shaft that provides a seal between the shaft and the bore. The annular seal assembly includes a first member that is configured to seal against a radial surface of the bore and a second member that is configured to seal against an axial surface of the annular channel.

In a further embodiment of the foregoing gas turbine engine, the annular channel includes at least one guide surface and the second member includes a guided surface. An interface between the guide surface and the guided surface are configured to generate the seal against the axial surface.

In a further embodiment of any of the foregoing gas turbine engines, the interface between the guide surface and the guided surface is configured to generate a biasing force against the first member in response to rotation of the shaft and rotor.

In a further embodiment of any of the foregoing gas turbine engines, the guide surface and the guided surface are both angled relative to a plane perpendicular to the engine axis.

In a further embodiment of any of the foregoing gas turbine engines, the annular channel includes a first guide surface and a second guide surface and the annular seal assembly includes a third member that is disposed on an axially opposite side of the first member. The second member abuts the first guide surface and the third member includes a guided surface that is configured to abut the second guide surface.

In a further embodiment of any of the foregoing gas turbine engines, the first member includes a first radial height and the second member includes a second radial height that is less than the first radial height.

In a further embodiment of any of the foregoing gas turbine engines, the first member includes a rectilinear shape in cross-section.

In a further embodiment of any of the foregoing gas turbine engines, the second member includes a wedge shape in cross-section.

In a further embodiment of any of the foregoing gas turbine engines, the rotor is disposed on the compressor section.

A method of creating a seal between co-rotating components of a gas turbine engine according to another exemplary embodiment of this disclosure includes, among other possible things, assembling a first seal member within an annular channel of a first component, assembling a second seal member within the annular channel such that the second seal abuts an axial face of the first seal member and a guide surface of the annular channel, configuring the first seal to expand radially outward into sealing contact with a surface of second component that is radially spaced apart from the first component in response to rotation, and configuring the second seal member to abut the guide surface of the annular channel and an axial surface of the first seal to generate an axial seal with the guide surface in response to rotation.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
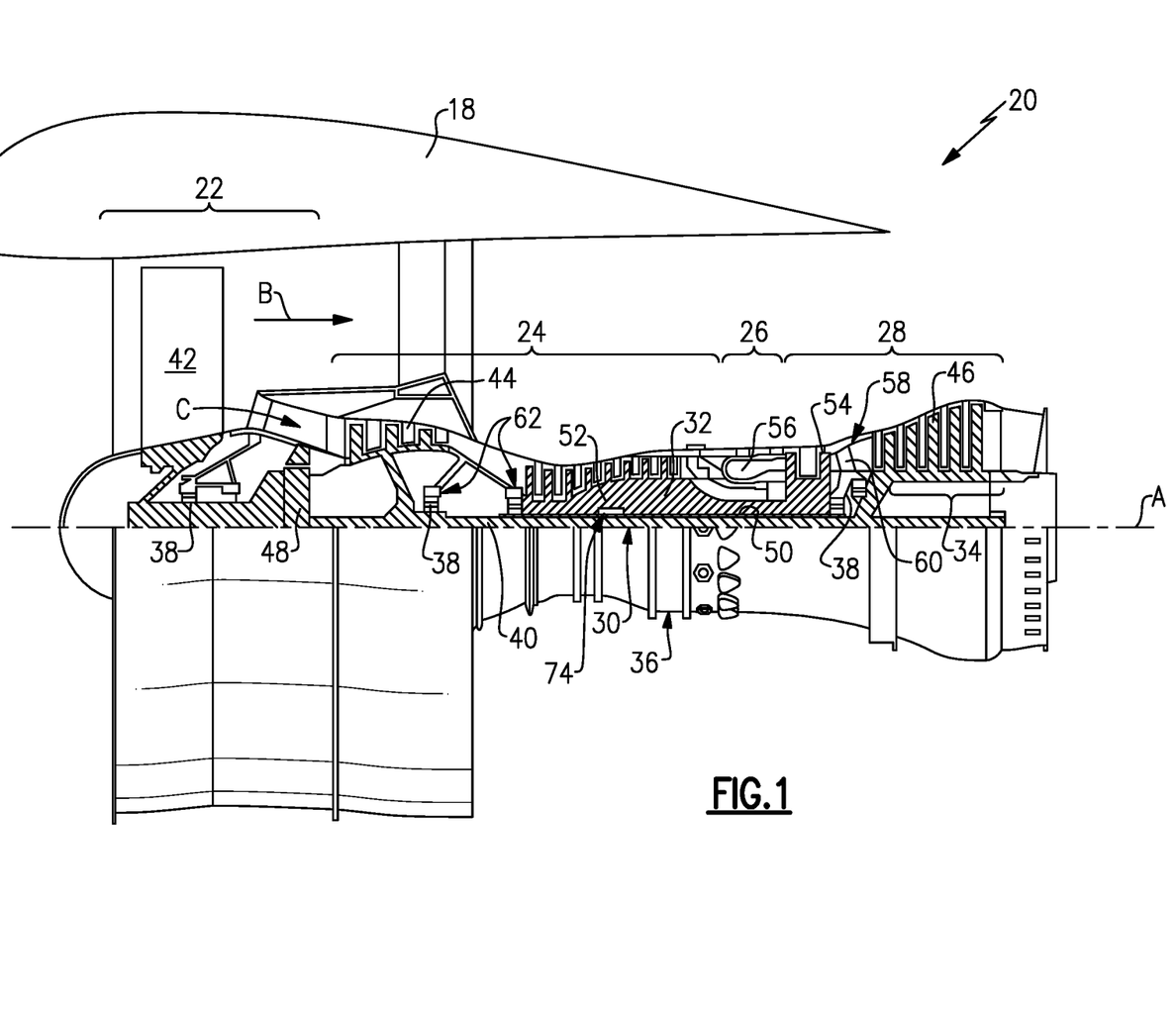
FIG. 1 is a schematic view of an example gas turbine engine.

FIG. 1 schematically illustrates a gas turbine engine 20. The example turbine engine 20 includes a multi-part seal assembly 74 disposed within a compressor section 24 to reduce leakage between compressor stages.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

Figure 2:
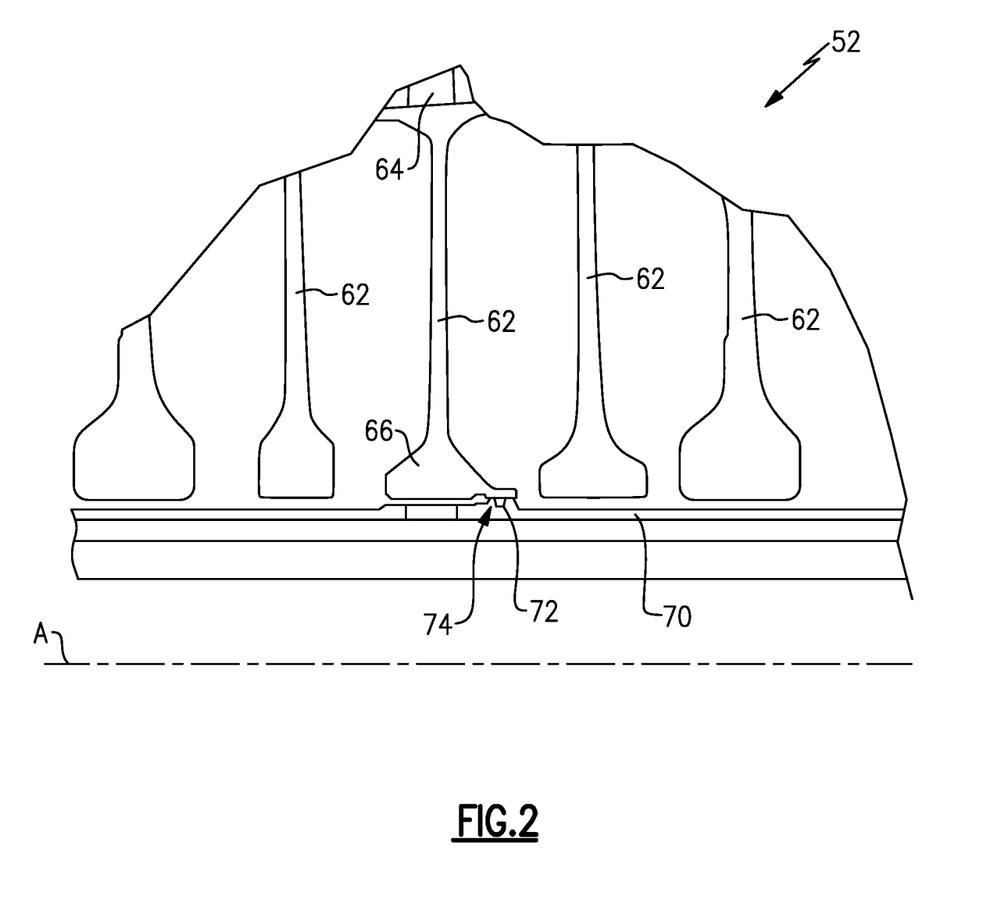
FIG. 2 is a schematic view of a portion of a compressor section.
Figure 3:
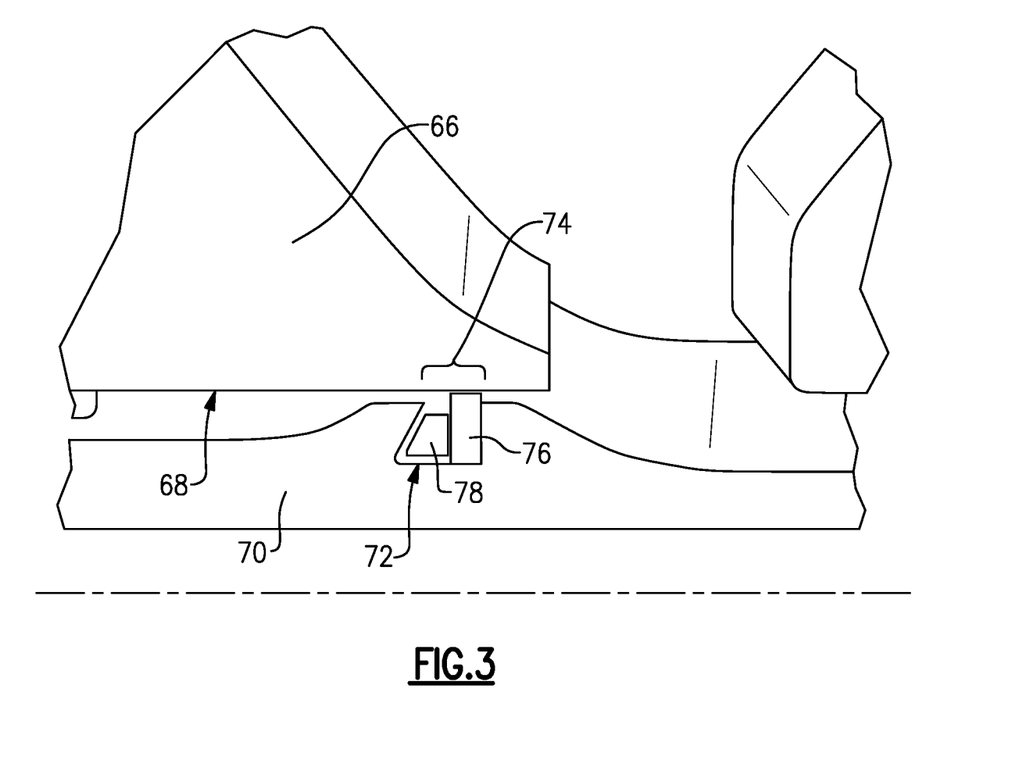
FIG. 3 is an enlarged view of an example multi-part ring seal assembly.

Referring to FIGS. 2 and 3, a portion of the HPC 52 is schematically shown and includes a plurality of rotors 62 for separate compressor stages. Each of the rotors 62 includes a plurality of blades 64 and a hub 66 that defines an inner bore 68. A multi-part seal assembly 74 provides a seal the inner bore 68 and a shaft 70. The example seal assembly 74 seals against leakage between compressor stages. The shaft 70 and the rotor 62, and thereby the hub 66, co-rotate. In other words, the hub 66 and shaft 70 rotate together such that no relative rotation is present. Although a compressor section is disclosed and described by way of example, the example multi-part seal assembly 74 may be utilized in other sections of the gas turbine engine that have co-rotating hubs and shafts, such as for example, the turbine section.

The shaft 70 includes an annular channel 72 that receives the seal assembly 74. The seal assembly 74 includes a first seal member 76 and a second seal member 78 that are both disposed within the annular channel 72. The first seal member 76 is generally rectangular in cross-section and the second seal ember 78 is generally trapezoidal in cross-section.

Figure 4:
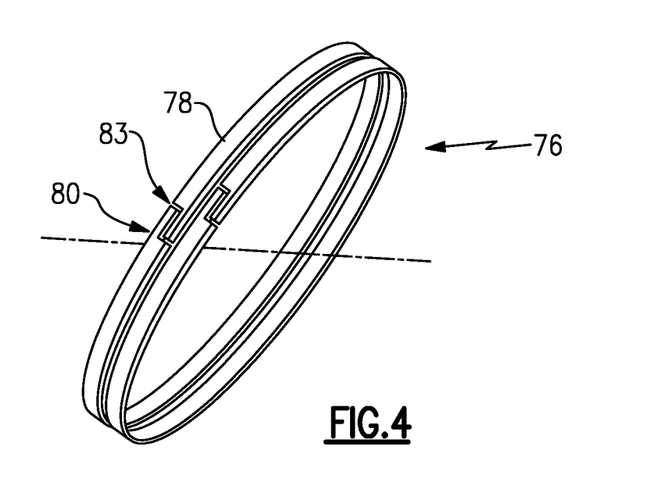
FIG. 4 is a schematic view of the multi-part ring seal assembly.

Referring to FIG. 4, with continued reference to FIG. 3 each of the seal members 76, 78 include a split 80, 83. Each of the splits 80, 83 enable expansion to assist assembly into the annular channel 72. The splits 80, 83 are purposely mis-aligned circumferentially so as to not form a leakage path.

Figure 5:
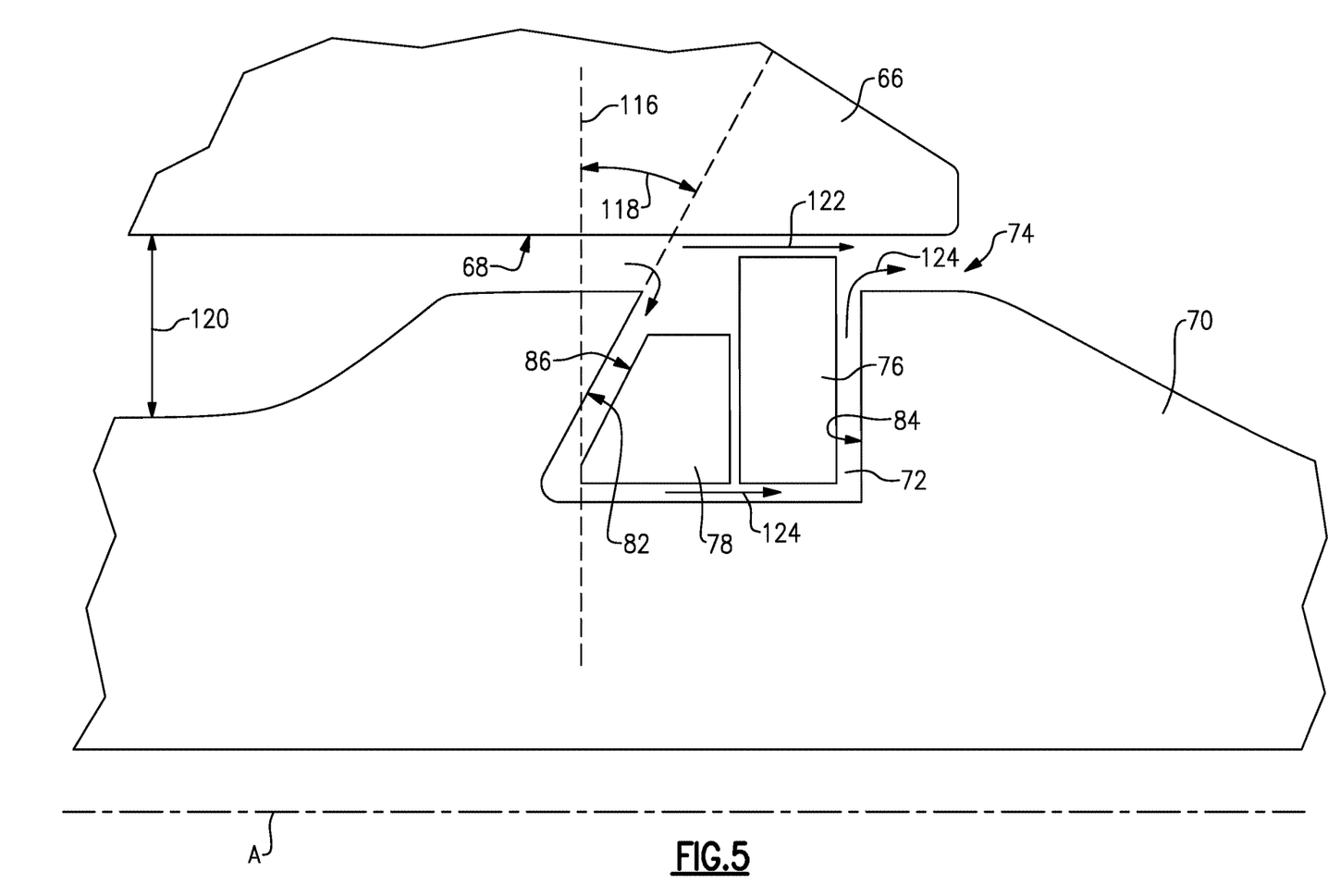
FIG. 5 is a cross-sectional view of an example multi-part ring seal assembly embodiment.

Referring to FIG. 5, the example annular channel 72 includes a guide surface 82 and the second seal member 78 includes a guided surface 86. The example guide surface 82 is disposed at an angle 118 relative to a plane 116 perpendicular to the engine axis A. The angled guide surface 86 and the guided surface 86 of the second seal member 78 are substantially the same. A second side 84 of the annular channel 72 is perpendicular to the engine axis A to provide an axial facing surface.

The seal assembly 74 provides for sealing a radial gap 120 between the inner bore 68 and the shaft 70. Leakage flows, indicated by arrow 122 may through the radial gap 120 are sealed by the first seal member 76. Leakage flows indicated by arrows 124 around the seals 76, 78 are substantially prevented by interaction between the second seal member 78, the guide surface 82, the first seal member 76 and the axial surface 84.

Figure 6:
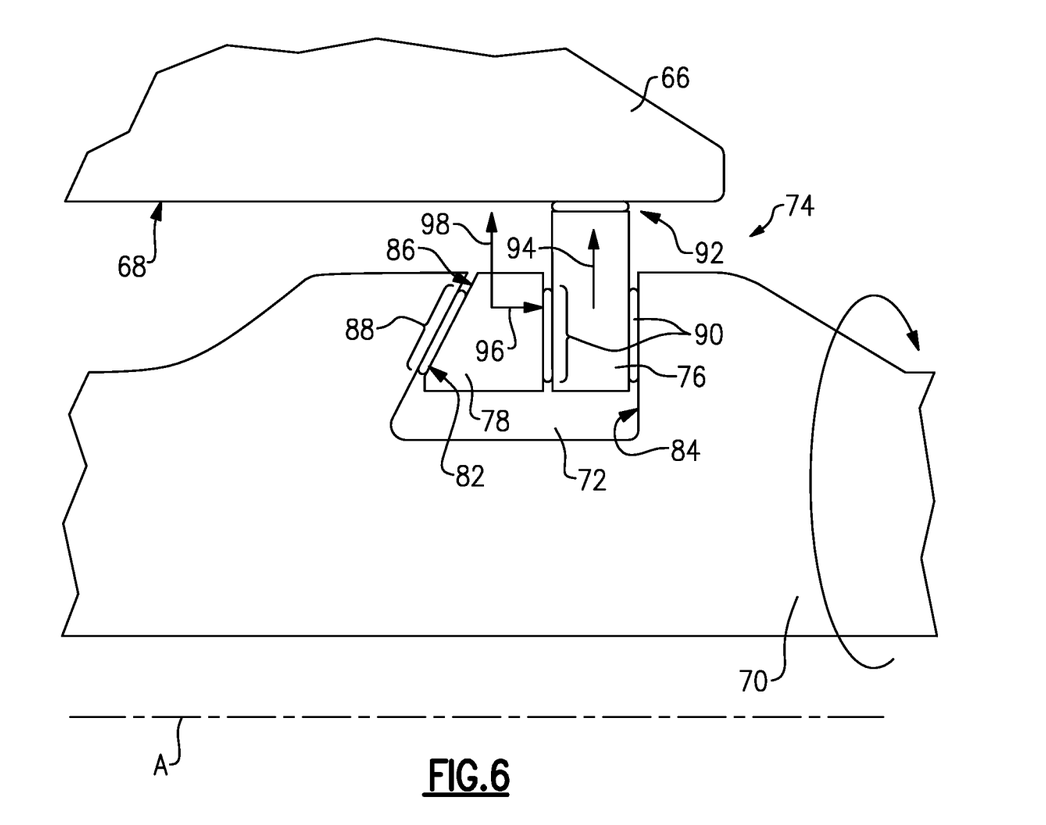
FIG. 6 is another cross-sectional view of the example multi-part ring seal assembly embodiment.

Referring to FIG. 6 with continued reference to FIG. 5, the seal assembly 74 is shown during operation where both the shaft 70 and the hub 66 are rotating. Rotation generates circumferential forces that drive both the first seal member and the second seal member 78 radially outward. The first seal member 76 is driven radially outward as indicated by arrow 94 into sealing contact with the inner bore 68. A seal 92 is therefore formed that prevents the leakage flow 122 shown in FIG. 5.

Rotation drives the guided surface 86 of the second seal member 78 along the guide surface 82 of the annular channel 72. The angled configuration of the guide surface 82 generates an axially directed force indicated by arrow 96 that moves the second seal member 78 in an axial direction in response to radial movement indicated by arrow 98. The axial movement forces the first seal member 76 against the axial surface 84 to create axial seals 90. The interface between the guide surface 82 and the guided surface 86 creates a seal 88. The seals 88 and 90 prevents or substantially reduces the leakage flows indicated by arrows 124 in FIG. 5. Accordingly, the example seal assembly 74 utilizes the centrifugal forces generated by rotation to seal both the radial gap 120 and the axial leakage path around the seals 76, 78.

Figure 7:
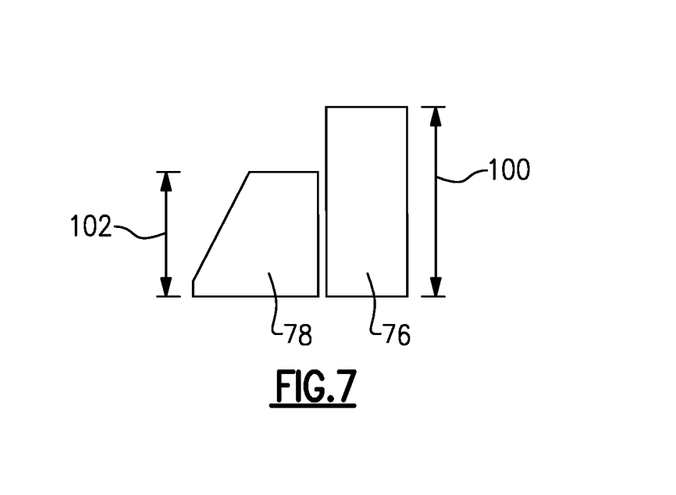
FIG. 7 is a cross-sectional view of the example multi-part ring seal assembly embodiment.

Referring to FIG. 7, the example seal members 76, 78 provide different sealing functions and therefore are shaped and sized appropriately. In one example embodiment, the first seal member 76 includes a height 100 that provides for the formation of the radial seal against the inner bore 68 and against the axial surface 84 of the annular channel 72. The first seal member 76 is shown as substantially rectangular in cross-section.

The second seal member 78 provides for sealing against axial face but not against the radial surface of the inner bore 68. Accordingly, in the disclosed example embodiment, the second seal member 78 includes a height 102 that is less than the height 100 of the first seal member 78. The reduced height of the second seal member 78 prevents constraint of axial movement by radial contact with the inner bore 68. As appreciated, the extend of axial movement of the second seal member 78 provides for the additional sealing with surfaces of the annular channel 72 to prevent leakage flows around the seal assembly 74. The axial movement of the second seal member 78 is defined by the angle 118 and is a function of the radial movement generated by the centrifugal forces during operation. Accordingly, the height 102 of the second seal member 78 is provided to prevent radial contact that could constrain the desired axial movement and biasing forces.

Although the example first seal member 76 is shown as rectangular in cross-section, other rectilinear shapes that provide for creation of the desired radial seal could be utilized and are within the scope of this disclosure. Moreover, the example second seal member 78 is shown as trapezoidal or wedge shaped in cross-section, other shapes with surfaces that generate axial movement in response to radially outward movement could also be utilized and are within the contemplation of this disclosure. Each of the first sealing member 76 and the second sealing member 78 may be irregularly shaped to enable tailoring to application specific conditions. The size of each of the sealing members 76, 78 will vary depending on application specific requirements and sealing requirements.

Figure 8:
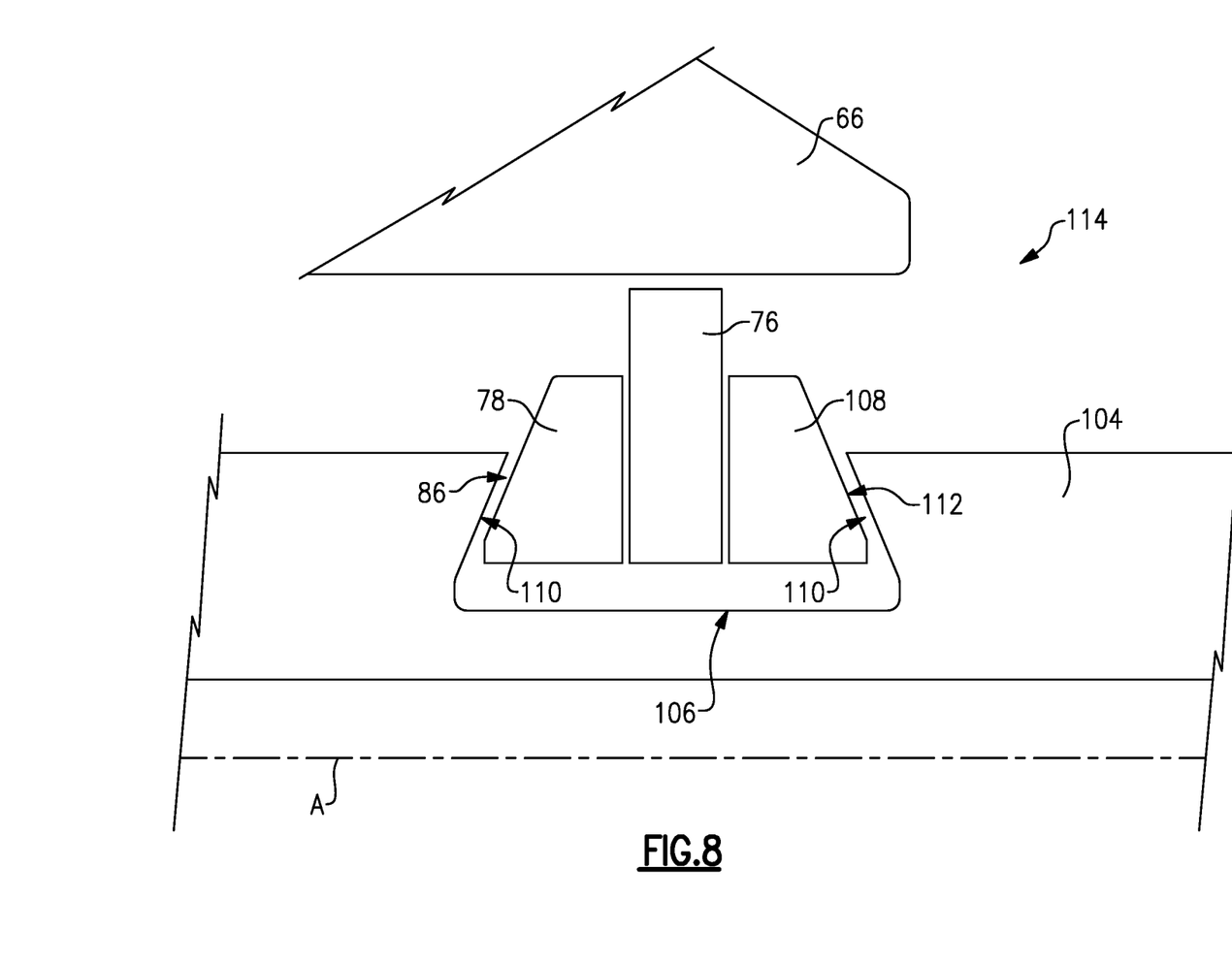
FIG. 8 is a schematic view of another example multi-part ring seal assembly embodiment.

Referring to FIG. 8 another example multi-part ring seal assembly 114 is shown and includes a third sealing member 108 with an angled guided surface 112. The guided surface 112 guides along a second guide surface 110 defined by the annular channel 106 in the shaft 104. In this example embodiment, the annular channel 106 includes both sides that are angled. The first sealing member 76 is disposed between the second sealing member 78 and the third sealing member 108.

Centrifugal forces generate radial movement of all of the sealing members 76, 78 and 108. The second sealing member 78 and the third sealing member 108 both guide along corresponding guide surfaces 110 and sandwich the first sealing ember 76 therebetween. The first sealing ember 76 moves radially outward and forms a seal against the inner bore 68. The second and third sealing members 78, 108 moves both radially outward and axially inward toward the first sealing member 76. The first and second sealing members 78, 108 create a seal on each side of the first sealing member 76 and against the corresponding guide surface 110 of the annular channel 106.

Accordingly, the disclosed multi-part seal assemblies seal against radial and axial surfaces to reduce leakage between inner bore surfaces and a co-rotating shaft.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A rotor assembly for a gas turbine engine comprising:
a rotor including a hub having a bore with an inner radial surface, the rotor carrying one or more rotatable blades;
a shaft rotatable about an engine axis and extending through the bore, wherein the shaft is co-rotatable with the rotor and includes an annular channel, the annular channel including a cross-section that comprises guide surface angled relative to a plane perpendicular to the engine axis; and
an annular seal assembly carried within the annular channel within the shaft providing a seal between the shaft and the bore, the annular seal assembly including a first member comprising a rectangular shaped cross-section configured to seal against an inner radial surface of the bore and a second member comprising a wedge-shape in cross-section configured to seal against the guide surface of the annular channel, wherein movement of the second member radially outward along the guide surface of the annular channel generates a corresponding axial movement of the second member against the first member.

2. The rotor assembly as recited in claim 1, wherein the second member includes a guided surface and the annular channel includes an axial surface, wherein an interface between the guide surface and the guided surface is configured to generate a biasing force to force the first seal member against the axial surface.

3. The rotor assembly as recited in claim 2, wherein the interface between the guide surface and the guided surface is configured such that the second member generates a biasing force against the first member in a direction parallel to the engine axis in response to rotation of the shaft and the rotor.

4. The rotor assembly as recited in claim 2, wherein the guide surface and the guided surface are both angled relative to a plane perpendicular to the engine axis.

5. The rotor assembly as recited in claim 1, wherein the guide surface of the annular channel comprises a first guide surface and a second guide surface and the annular seal assembly includes a third member comprising a second wedge shape in cross-section disposed on an axially opposite side of the first member from the second member, the second member abutting the first guide surface and the third member including a guided surface that is configured to abut the second guide surface.

6. The rotor assembly as recited in claim 1, wherein the first member includes a first radial height and the second member includes a second radial height that is less than the first radial height.

7. The rotor assembly as recited in claim 1, wherein the rotor is part of a compressor section of the gas turbine engine.

8. The rotor assembly as recited in claim 1, wherein each of the first member and the second member includes a circumferential gap between circumferentially spaced apart ends.

9. A gas turbine engine comprising:
   a fan including a plurality of fan blades rotatable about an axis;
   a compressor section;
   a combustor in fluid communication with the compressor section;
   a turbine section in fluid communication with the combustor;
   a rotor within at least one of the turbine section and the compressor section, the rotor including a hub having a bore and carrying one or more rotatable blades, wherein the bore comprises an inner radial surface;
   a shaft rotatable about the axis, the shaft extending through the bore, co-rotatable with the rotor, and comprising an annular channel comprising a cross-section parallel to the axis that comprises a guide surface angled relative to a plane perpendicular to the axis; and
   an annular seal assembly carried within the annular channel within the shaft, the annular seal assembly providing a seal between the shaft and the bore, the annular seal assembly comprising a first member comprising a rectangular shaped cross-section configured to seal against the inner radial surface of the bore and a second member comprising a wedge shape in cross-section to seal against the guide surface of the annular channel, wherein movement of the second member radially outward along the guide surface of the annular channel generates a corresponding axial movement of the second member against the first member.

10. The gas turbine engine as recited in claim 9, wherein the the second member includes a guided surface that guides along the guide surface of the annular channel, wherein an interface between the guide surface and the guided surface is configured to generate axial movement of the second member against the first member.

11. The gas turbine engine as recited in claim 10, wherein the interface between the guide surface and the guided surface is configured to generate a biasing force against the first member in response to rotation of the shaft and the rotor.

12. The gas turbine engine as recited in claim 9, wherein the first member includes a first radial height and the second member includes a second radial height that is less than the first radial height.

13. The gas turbine engine as recited in claim 9, wherein the rotor is disposed on the compressor section.

14. A gas turbine engine comprising:
   a fan including a plurality of fan blades rotatable about an axis;
   a compressor section;
   a combustor in fluid communication with the compressor section;
   a turbine section in fluid communication with the combustor;
   a rotor within at least one of the turbine section and the compressor section, the rotor including a hub having a bore and carrying one or more rotatable blades, wherein the bore comprises an inner radial surface;
   a shaft rotatable about the axis, the shaft extending through the bore, co-rotatable with the rotor, and comprising an annular channel comprising a cross-section parallel to the axis that comprises a guide surface angled relative to a plane perpendicular to the axis; and
   an annular seal assembly carried within the annular channel within the shaft, the annular seal assembly providing a seal between the shaft and the bore, the annular seal assembly comprising a first member comprising a rectangular shaped cross-section configured to seal against the inner radial surface of the bore and a second member comprising a wedge shape in cross-section to seal against the guide surface of the annular channel, wherein the guide surface of the annular channel comprises a first guide surface and a second guide surface and the annular seal assembly includes a third member comprising a second wedge shape in cross-section disposed on an axially opposite side of the first member from the second member, the second member abutting the first guide surface and the third member including a guided surface that is configured to abut the second guide surface.

* * * * *